US009086612B2

(12) United States Patent
Korekuni et al.

(10) Patent No.: US 9,086,612 B2
(45) Date of Patent: Jul. 21, 2015

(54) INTERCHANGEABLE LENS AND CAMERA BODY TO WHICH INTERCHANGEABLE LENS IS MOUNTABLE

(71) Applicant: Panasonic Corporation, Osaka (JP)

(72) Inventors: Jin Korekuni, Nara (JP); Yoshio Ohtsuka, Osaka (JP); Yasuhiro Wada, Osaka (JP); Yasunori Nakai, Nara (JP); Shun Yamaguchi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 58 days.

(21) Appl. No.: 13/644,002

(22) Filed: Oct. 3, 2012

(65) Prior Publication Data

US 2013/0088632 A1    Apr. 11, 2013

(30) Foreign Application Priority Data

Oct. 6, 2011  (JP) ................................. 2011-221626

(51) Int. Cl.
| | |
|---|---|
| G02B 13/16 | (2006.01) |
| H04N 5/225 | (2006.01) |
| G03B 17/14 | (2006.01) |
| H04N 5/232 | (2006.01) |
| G03B 31/00 | (2006.01) |

(52) U.S. Cl.
CPC ............... *G03B 17/14* (2013.01); *G03B 31/00* (2013.01); *H04N 5/23209* (2013.01); *G03B 2205/0046* (2013.01); *G03B 2206/00* (2013.01)

(58) Field of Classification Search
CPC ............ H04N 5/23296; H04N 5/2628; H04N 5/2328; H04N 5/23212; H04N 5/23293
USPC ............ 348/335, 340, 345, 350, 352, 240.99, 348/240.1, 240.2, 240.3
See application file for complete search history.

(56) References Cited

U.S. PATENT DOCUMENTS

| | | | | |
|---|---|---|---|---|
| 5,087,978 | A * | 2/1992 | Hieda | 348/363 |
| 2011/0063461 | A1 * | 3/2011 | Masuda | 348/208.11 |
| 2012/0060614 | A1 * | 3/2012 | Yoshida et al. | 73/649 |

FOREIGN PATENT DOCUMENTS

| | | |
|---|---|---|
| JP | 4-233873 | 8/1992 |
| JP | 2003-57527 | 2/2003 |
| JP | 2006-39388 | 2/2006 |
| JP | 2006-352342 | 12/2006 |
| JP | 2007-121492 | 5/2007 |
| JP | 2010-197763 | 9/2010 |

* cited by examiner

*Primary Examiner* — Yogesh Aggarwal
(74) *Attorney, Agent, or Firm* — Panasonic Patent Center (57) ABSTRACT

There is provided an interchangeable lens mountable to a camera body. The interchangeable lens includes a zoom lens which can change a field angle of a subject image, a receiving unit for receiving sound pickup property information from the camera body, the sound pickup property information indicating sound pickup property of the camera body, and a lens controller for controlling drive of the zoom lens. The lens controller decides an available driving speed based on the sound collecting property information, the available driving speed being a driving speed settable to the zoom lens.

14 Claims, 6 Drawing Sheets

| DRIVING SPEED OF ZOOM LENS | LOUDNESS OF NOISE |
|---|---|
| LOW SPEED | SMALL |
| HIGH SPEED | MEDIUM |

| | | LOUDNESS OF NOISE | | |
|---|---|---|---|---|
| | | SMALL | MEDIUM | LARGE |
| SOUND PICKUP PROPERTY OF CAMERA BODY | WEAK | ○ | ○ | ○ |
| | MEDIUM | ○ | ○ | × |
| | STRONG | ○ | × | × |

○ : SYMBOL INDICATING THAT ZOOM SPEED CORRESPONDING LOUDNESS OF NOISE IS AVAILABLE
× : SYMBOL INDICATING THAT ZOOM SPEED CORRESPONDING LOUDNESS OF NOISE IS NOT AVAILABLE

Fig. 6

INTERCHANGEABLE LENS AND CAMERA BODY TO WHICH INTERCHANGEABLE LENS IS MOUNTABLE

BACKGROUND

1. Technical Field

The present disclosure relates to an interchangeable lens and a camera body which control a member to be driven in the interchangeable lens.

2. Related Art

Digital cameras which are equipped with a microphone for sound pickup and capable of recording audio data are known. While a microphone of that kind of digital camera is capable of picking up outside sound, the microphone causes a problem that vibration sound produced by a driving unit (for example, a driving unit for a lens) inside the digital camera and transmitted through the casing and the like is also picked up as noise.

An art for solving such a problem is disclosed in JP2006-352342A, for example. In the digital camera disclosed in JP2006-352342A, an elastic member and the like cover the microphone to prevent the microphone from picking up such a noise.

SUMMARY

The present disclosure provides an interchangeable lens which can restrain sound pickup of a noise caused by a driving unit, and a camera body to which the interchangeable lens is mountable.

The present disclosure provides an interchangeable lens mountable to a camera body. The interchangeable lens includes a zoom lens which can change a field angle of a subject image, a receiving unit for receiving sound pickup property information from the camera body, wherein the sound pickup property information indicates sound pickup property of the camera body, and a lens controller for controlling drive of the zoom lens. The lens controller decides an available driving speed based on the sound pickup property information, wherein the available driving speed is a driving speed settable to the zoom lens.

The present disclosure also provides a camera body to which the interchangeable lens is mountable. The camera body includes a sound pickup unit for picking up ambient sound, a storage unit for storing sound pickup property information indicating sound pickup property of the sound pickup unit, and a sending unit for sending the sound pickup property information to the interchangeable lens.

According to the interchangeable lens and the camera body of the present disclosure, the interchangeable lens decides the available driving speed of the zoom lens based on the sound pickup property information sent from the camera body. This arrangement can reduce the noise caused by drive of the zoom lens and picked up by the sound pickup unit of the camera body in comparison to the conventional approach.

DETAILED DESCRIPTION OF THE PREFERRED EMBODIMENTS

Embodiments will be described below with reference to the attached drawings. A digital camera will be taken as an example of Embodiments.

In the detailed description, certain unnecessary portions regarding, for example, conventional art, redundant description on substantially the same configuration may be omitted for ease of description.

The following description and the attached drawings are disclosed to enable those skilled in the art to sufficiently understand the present disclosure, and are not intended to limit the subject matter of the claims.

1. Configuration of Digital Camera

1-1. Outline of Configuration of Digital Camera

Figure 1:
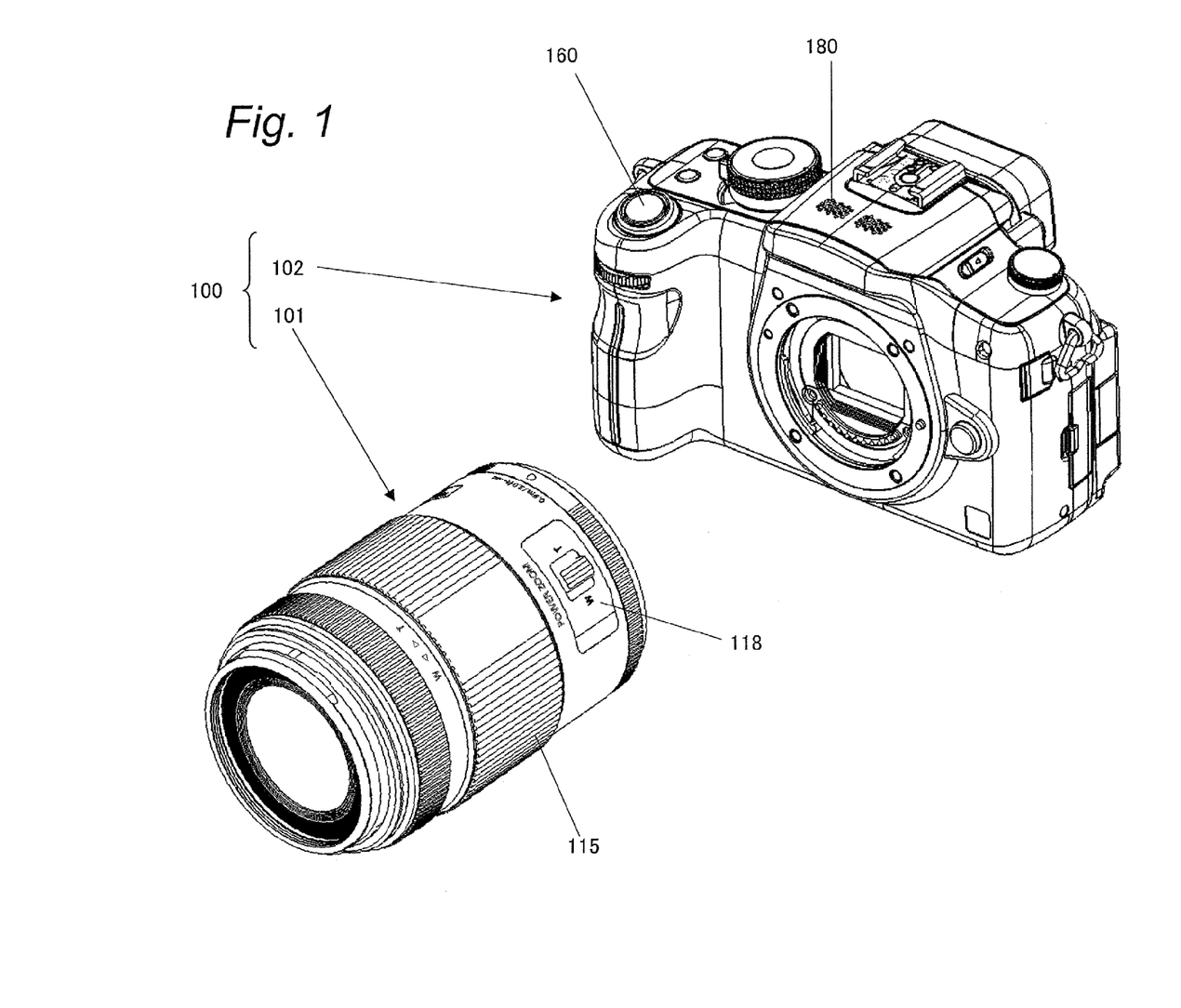
FIG. 1 is a perspective view of a digital camera according to a present embodiment.

The outline of the configuration of the digital camera according to the present embodiment will be described with reference to FIG. 1. The digital camera 100 is composed of an interchangeable lens 101, and a camera body 102 to which the interchangeable lens 101 can be mounted. The interchangeable lens 101 is enabled to change the zoom magnification when a zoom lens driving unit (actuator and the like) is controlled based on user's operation.

The interchangeable lens 101 includes a zoom ring 115, a zoom lever 118, and the like. In response to reception of user's operation, the zoom ring 115 and/or the zoom lever 118 controls the zoom lens of the interchangeable lens 101 based on the user's operation.

The camera body 102 includes a release button 160, a microphone 180, and the like. When the release button 160 receives user's operation, the camera body 102 can transmit a control signal for an autofocus operation to the interchangeable lens 101 mounted thereto and perform an image sensing operation of a subject image which is formed through the interchangeable lens 101.

The microphone 180 is installed on the top surface of the camera body 102. The microphone 180 is used for recording sound in a movie recording mode.

Figure 2:
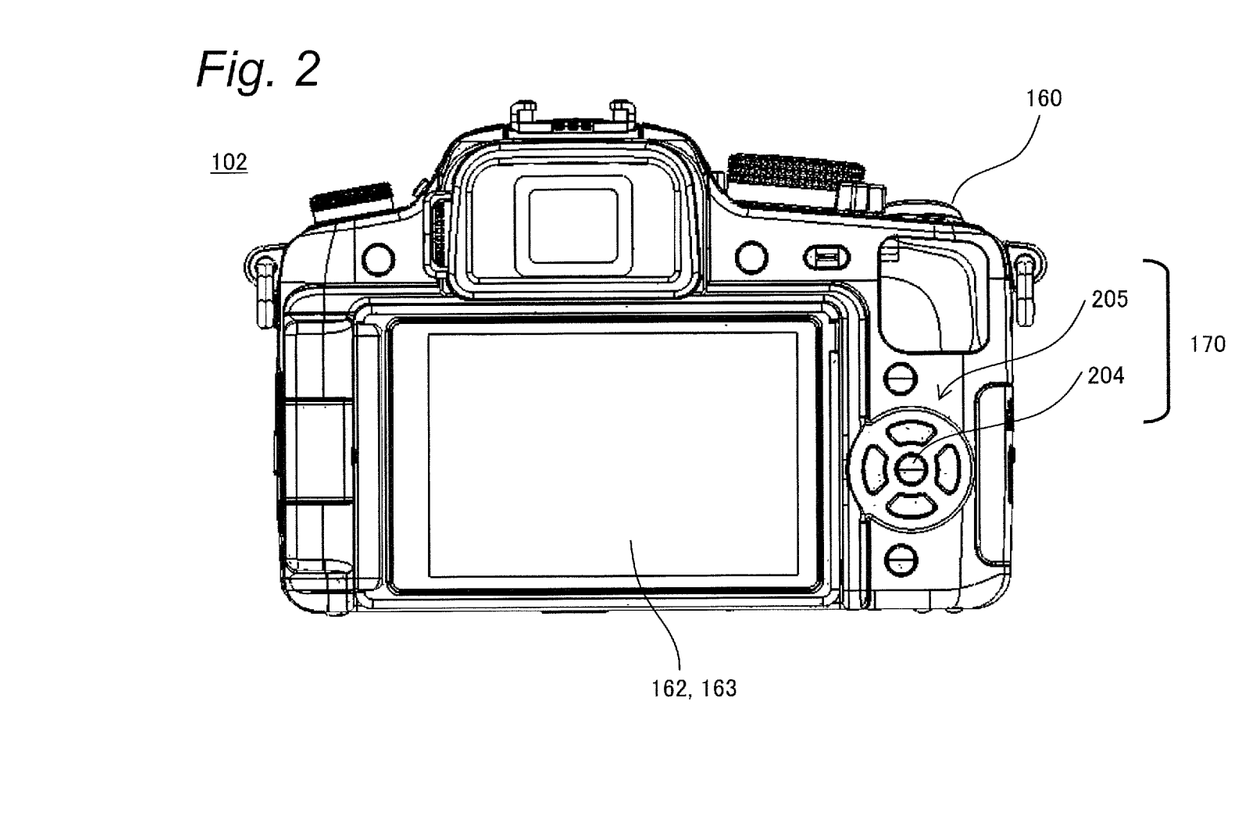
FIG. 2 is a rear view of the digital camera according to the present embodiment.

The elements provided on the rear surface portion of the camera body 102 will be described with reference to FIG. 2. The camera body 102 includes a liquid crystal monitor 163, a touch panel 162, a camera side operation unit 170 including a center button 204 and directional buttons 205, and the like, on its rear surface portion. When the touch panel 162 and/or the camera side operation unit 170 receive/receives user's operation, the camera body 102 performs various operations based on the user's operation.

Figure 3:
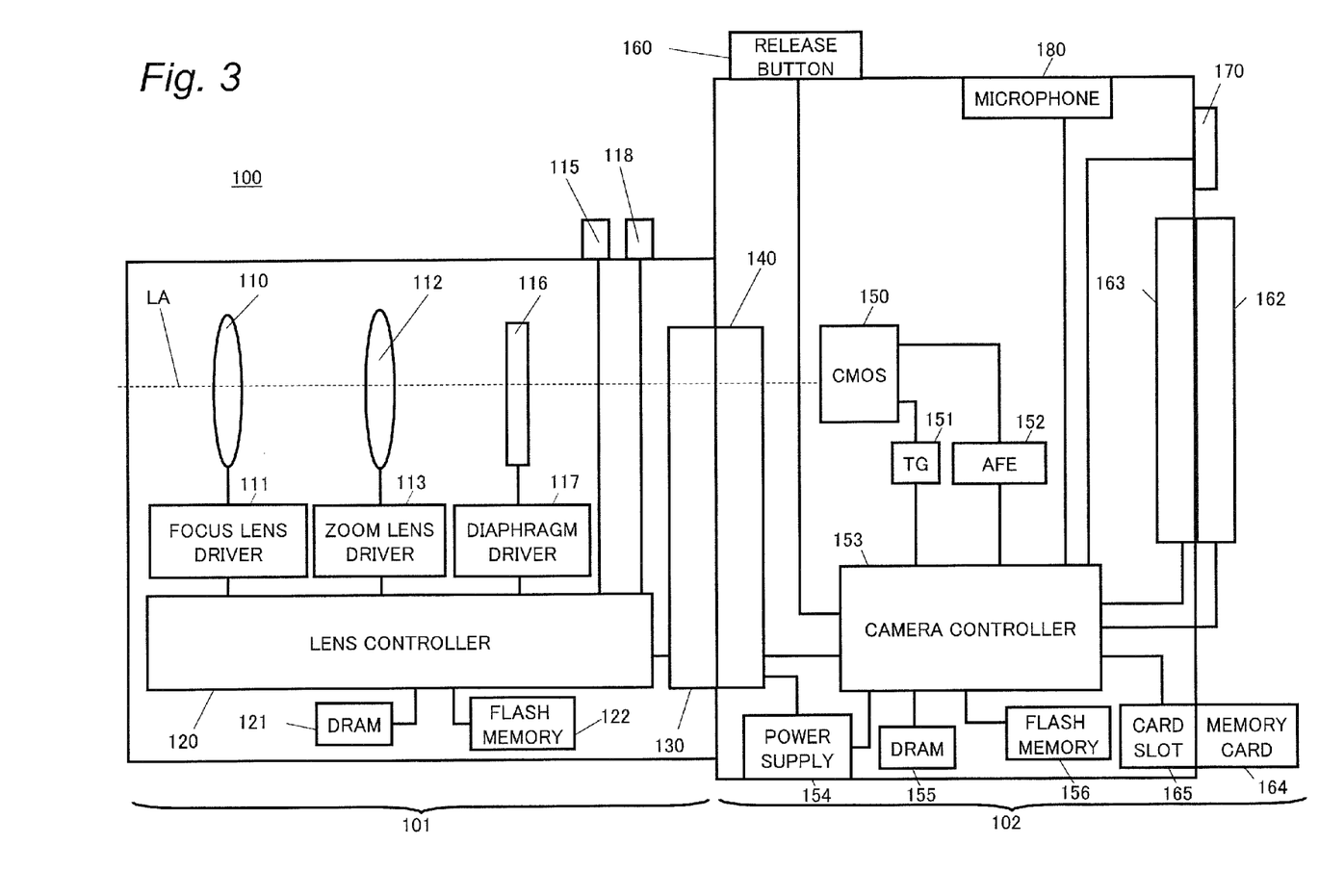
FIG. 3 is a block diagram showing an electric configuration of the digital camera according to the present embodiment.

The configuration of the digital camera 100 will be described with reference to FIG. 3. The interchangeable lens 101 includes a lens controller 120, a lens mount 130, an optical system including a focus lens 110 and a zoom lens 112, a focus lens driver 111, a zoom lens driver 113, a diaphragm 116, a diaphragm driver 117, a zoom ring 115, a zoom lever 118, a DRAM 121, a flash memory 122, and the like. The camera body 102 includes a camera controller 153, a body mount 140, a CMOS image sensor 150, a timing generator (TG) 151, an analog front end (AFE) 152, a liquid crystal monitor 163, a touch panel 162, a release button 160, a camera side operation unit 170, a microphone 180, a power supply 154, a DRAM 155, a flash memory 156, a card slot 165, a memory card 164, and the like. The dotted line LA represents an optical axis.

1-2. Configuration of Interchangeable Lens

The configuration of the interchangeable lens 101 will be described.

The lens controller 120 controls the respective sections of the interchangeable lens 101. When the zoom ring 115 and/or the zoom lever 118 receive/receives user's operation, the lens controller 120 instructs the zoom lens driver 113 to drive the zoom lens 112 based on the received operation. Since the lens controller 120 is connected with the DRAM 121 and the flash memory 122, the lens controller 120 can write information into the DRAM 121 and/or the flash memory 122, or read information out from the DRAM 121 and/or the flash memory 122 as required. Further, the lens controller 120 communicates with the camera controller 153 via the lens mount 130. The lens controller 120 may be composed of a hard-wired electric circuit, a microcomputer with programs, or the like.

The lens mount 130 is a connecting member for mechanically and electrically connecting the interchangeable lens 101 with the camera body 102 in cooperation with the body mount 140 of the camera body 102. Since the interchangeable lens 101 is mechanically and electrically connected with the camera body 102, the lens controller 120 can communicate with the camera controller 153.

The DRAM 121 is used as a work memory when the lens controller 120 performs the various controls. The flash memory 122 stores a program, parameters, lens data and/or the like to be used by the lens controller 120 in performing the various controls.

The focus lens 110 is a lens for changing a focus state of a subject image which enters the optical system of the interchangeable lens 101 and is formed on the CMOS image sensor 150. The focus lens 110 may be composed of a single lens or a plurality of lenses. The focus lens 110 may also be composed of a group of lenses or groups of lenses. The focus lens driver 111 drives the focus lens 110 to move along the optical axis LA of the optical system based on the control signal transmitted from the lens controller 120. Here, the focus lens driver 111 is implemented with, for example, a stepping motor, a DC motor, an ultrasonic motor, or the like.

The zoom lens 112 is a lens for changing the magnification of the subject image which is formed through the optical system of the interchangeable lens 101. The zoom lens 112 may be composed of a single lens or a plurality of lenses. The zoom lens 112 may also be composed of a group of lenses or groups of lenses. The zoom lens driver 113 drives the zoom lens 112 to move along the optical axis LA of the optical system based on the control signal transmitted from the lens controller 120. Here, the zoom lens driver 113 is implemented with, for example, a stepping motor, a DC motor, an ultrasonic motor, or the like.

The zoom lens 112 is driven at either of two driving speeds. Hereinafter, the higher driving speed of the two driving speeds is referred to as "high speed" and the lower driving speed is referred to as "low speed".

The diaphragm 116 is an adjusting member for adjusting quantity of a light incident on the optical system of the interchangeable lens 101. The diaphragm 116 is composed of a plurality of mechanical blades which can be opened and closed. The diaphragm driver 117 changes the opening of the mechanical blades composing the diaphragm 116 based on the control signal transmitted from the lens controller 120. Here, the diaphragm driver 117 is implemented with, for example, a stepping motor, a DC motor, an ultrasonic motor, or the like.

The zoom ring 115 is an operating member installed on the outside surface of the interchangeable lens 101. The zoom ring 115 is rotatably installed on the interchangeable lens 101. The detection unit (not shown) detects the rotational displacement and the rotational speed of the zoom ring 115 and notifies the lens controller 120 of the rotational displacement and the rotational speed. Based on the notified rotational displacement and/or rotational speed of the zoom ring 115, the lens controller 120 supplies a drive control signal to the zoom lens driver 113. Based on the operation received by the zoom ring 115, the lens controller 120 supplies the drive control signal to the zoom lens driver 113 to drive the zoom lens 112. The driving speed of the zoom lens 112 here is decided to be lower than the driving speed which is decided by the combination of the interchangeable lens 101 and the camera body 102 within the range of speed at which the zoom lens driver 113 can drive the zoom lens 112. A decision method of the driving speed of the zoom lens 112 will be described later.

The zoom lever 118 is an operating member installed on the outside surface of the interchangeable lens 101. The zoom lever 118 is implemented with a three position toggle switch. When detecting that the zoom lever 118 is inclined, the lens controller 120 supplies the drive control signal to the zoom lens driver 113 based on the direction in which the zoom lever 118 is inclined. When the zoom lever 118 receives zooming operation, the driving speed of the zoom lens 112 is decided to be the driving speed which is decided by the combination of the interchangeable lens 101 and the camera body 102 within the range of speed at which the zoom lens driver 113 can drive the zoom lens 112. Therefore, when the zoom lever 118 receives the zooming operation, the zoom lens 112 is driven at a constant speed unlike in the case where the zoom ring 115 receives the zooming operation.

Here, the lens controller 120 may decide the driving speed of the zoom lens 112 by detecting the direction in which the zoom lever 118 is inclined and the angle of the inclined zoom lever 118 as the bases for the decision. In this case, the zoom magnification changes at a constant speed which is decided by the direction and the angle of the inclined zoom lever 118.

The flash memory 122 stores noise information (see FIG. 5A) of the interchangeable lens 101. The "noise information" is information indicating relation between the noise produced by the interchangeable lens 101 in performing the zoom operation and the zoom speed. That is, the noise information indicates loudness of the noise produced by the zoom lens 112 driven at a certain speed. Therefore, the noise information is specific to each model of the interchangeable lens. When the driving speed of the zoom lens 112 increases, the noise caused by the drive of the zoom lens 112 becomes louder. The flash memory 122 stores a table for deciding the maximum driving speed of the zoom lens 112 (see FIG. 5B). Details of the table will be described later.

Figure 5A:
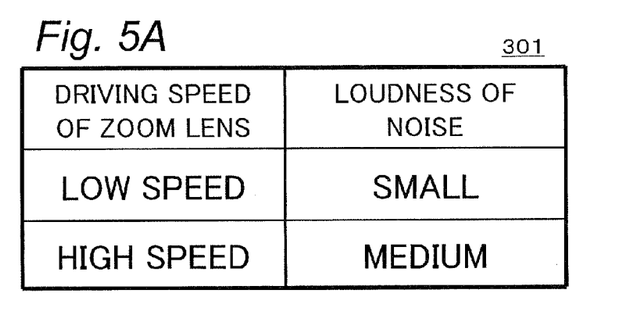
FIG. 5A is a table showing an example of noise information of an interchangeable lens according to the present embodiment.

The noise information ranks the loudness of the noise, which is produced by the zoom lens 112 being driven, as any of three stages of "small", "medium", and "large". The noise information of the present embodiment ranks the loudness of the noise produced by the zoom lens 112 driven at the low speed and the loudness of the noise produced by the zoom lens 112 driven at the high speed. That is, any one of "small", "medium", and "large" is indicated for the low speed and the high speed, respectively. In the noise information of the present embodiment, the value for the loudness of the noise produced in the low speed driving mode is set less than the value for the loudness of the noise produced in the high speed driving mode. For example, when the loudness of the noise produced in the high speed driving mode is ranked "medium", the loudness of the noise produced in the low speed driving mode is set to "small".

1-3. Configuration of Camera Body

The configuration of the camera body 102 will be described.

The camera controller 153 controls the respective sections (the CMOS image sensor 150 and the like) of the digital camera 100 based on the operation received by the release button 160, the touch panel 162 and/or the camera side operation unit 170. Further, the camera controller 153 transmits a vertical synchronizing signal to the TG 151. In parallel to this, the camera controller 153 generates the exposure synchronizing signal based on the vertical synchronizing signal. The camera controller 153 periodically transmits the generated exposure synchronizing signal to the lens controller 120 via the body mount 140 and the lens mount 130. Since being connected with the DRAM 155 and the flash memory 156, the camera controller 153 can write information into the DRAM 155 and/or the flash memory 156, or read information out from the DRAM 155 and/or the flash memory 156 as required. The camera controller 153 may be composed of a hard-wired electric circuit, a microcomputer with programs, or the like.

The DRAM 155 is used as a work memory when the camera controller 153 performs the various controls. The flash memory 156 stores a program, parameters, and the like to be used by the camera controller 153 in performing the various controls.

The CMOS image sensor 150 generates image data by picking up a subject image which is incident thereto through the interchangeable lens 101. The generated image data is converted by the AFE 152 from the analog form into the digital form. The image data digitized by the AFE 152 is subject to various types of image processing by the camera controller 153. The image processing by the camera controller 153 includes gamma correction process, white balance correction process, scratch correction process, YC conversion process, electronic zoom process, and/or JPEG compression process, for example. The image processing other than those processes may be performed on the image data. In the present embodiment, another imaging device such as an nMOS image sensor, a CCD image sensor, or the other sensors may be used in place of the CMOS image sensor 150.

The CMOS image sensor 150 operates at the timing controlled by the TG 151. The operation of the CMOS image sensor 150 controlled by the TG 151 includes an image pickup operation of a still image, an image pickup operation of a through image, a data transfer operation and/or an electronic shutter operation. The through image is primarily a moving image. The liquid crystal monitor 163 displays a through image so as to enable the user to decide the composition for pickup of a still image.

The liquid crystal monitor 163 is installed on the rear surface portion of the camera body 102. The liquid crystal monitor 163 displays an image based on image data processed by the camera controller 153 for display. The liquid crystal monitor 163 selectively displays a moving image and a still image. Other than an image, the liquid crystal monitor 163 also displays various settings, conditions and the like of the digital camera 100. Although the liquid crystal monitor 163 is used as an example of the display means in present embodiment, the display means such as an organic EL display or the like may be used in place of the liquid crystal monitor 163.

The touch panel 162 is provided on the surface of the liquid crystal monitor 163 to generate information on a electrode position touched by the user on the touch panel 162. Based on the information on the electrode positions, the touch panel 162 calculates the position touched by the user on the touch panel 162 to notify the camera controller 153 of the position.

The body mount 140 is a connecting member for mechanically and electrically connecting the interchangeable lens 101 with the camera body 102 in cooperation with the lens mount 130 of the interchangeable lens 101. Since the interchangeable lens 101 is mechanically and electrically connected with the camera body 102, the lens controller 120 can communicate with the camera controller 153. The body mount 140 transmits the exposure synchronizing signal and other control signals received from the camera controller 153 to the lens controller 120 via the lens mount 130. The body mount 140 also transmits the various signals, which are received from the lens controller 120 via the lens mount 130, to the camera controller 153.

The power supply 154 supplies power to the respective sections of the digital camera 100. The power supply 154 may be a dry battery or a rechargeable battery, for example. In addition, the power supply 154 may supply power supplied through a power cord from an outside source to the respective sections of the digital camera 100. When the power switch (not shown) of the camera body 102 is switched on, the camera controller 153 instructs the power supply 154 to supply power to the respective sections of the digital camera 100. When receiving the instruction to supply power, the power supply 154 supplies power to the respective sections of the camera body 102. The power supply 154 also supplies power to the interchangeable lens 101 via the body mount 140 and the lens mount 130. Then, the lens controller 120 supplies power to the respective sections of the interchangeable lens 101.

The card slot 165 is a connection means for the removable memory card 164. The card slot 165 enables the memory card 164 to be electrically and mechanically connected with the digital camera 100. The card slot 165 may also be provided with a function of controlling the memory card 164.

The memory card 164 is an external memory incorporating a storage means such as a flash memory. The memory card 164 can store data processed by the camera controller 153, such as image data. The memory card 164 also can output stored data such as the image data to the camera controller 153. The image data output from the memory card 164 is processed by the camera controller 153. The image based on the processed image data is replayed, for example, on the liquid crystal monitor 163.

The release button 160 receives user's operation. The release button 160 is a push button which can be in two states of the half-press state and the full-press state. When the release button 160 becomes in the half-press state, the camera controller 153 performs an autofocus operation. When the release button 160 becomes in the full-press state, the camera controller 153 causes the memory card 164 to store the image data which is generated upon the full-press operation.

The camera side operation unit 170 is general name of the operating members including the center button 204 and the directional buttons 205. When the camera side operation unit 170 receives user's operation, the camera controller 153 performs various controls based on the received operation.

While a movie is recorded, the microphone 180 captures ambient sound around the digital camera 100 so as to transmit analog signals based on the sound to the camera controller 153. The camera controller 153 digitizes the received signals and causes the memory card 164 to store the digitized signals.

Figure 5B:
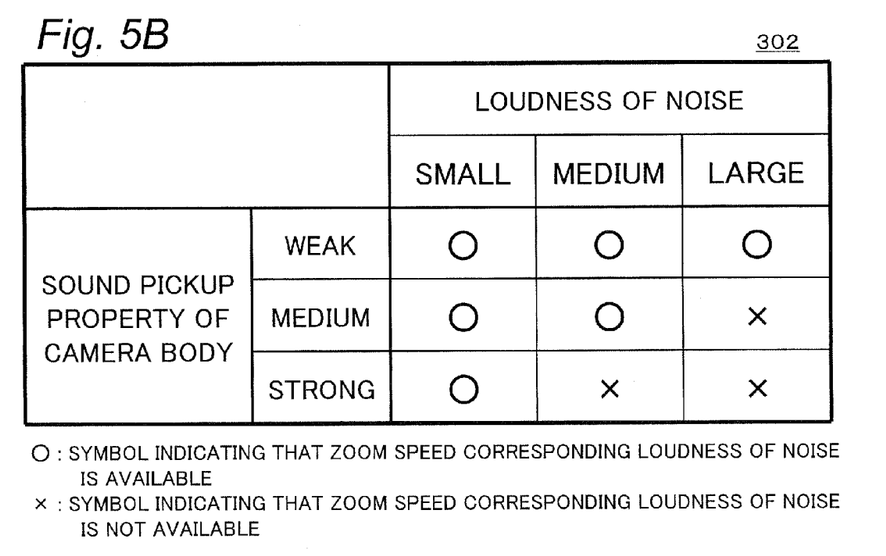
FIG. 5B is a table for describing relation between loudness of noise from the interchangeable lens, sound pickup properties of a camera body, and driving speeds settable to a zoom lens, according to the present embodiment.

The flash memory 156 stores the sound pickup property information that is information indicating the sound pickup property of the camera body 102 (see left part of FIG. 53). The sound pickup property information does not indicate the sound pickup property of the microphone 180 alone, but indicates the sound pickup property that is taken account of the sound pickup property of the microphone 180, the shape of the camera body 102, the position of the microphone 180 in the camera body 102, the distance between the interchangeable lens 101 mounted to the camera body 102 and the microphone 180, and/or the like. That is, the sound pickup property information indicates degree of ability to pick up the noise produced by the interchangeable lens 101 in sound pickup by the camera body 102. The sound pickup property information is specific to each model of the camera body 102.

The sound pickup property information ranks degree of picking up the noise produced by the interchangeable lens 101 (sound pickup property) as any of three stages of "weak", "medium", and "strong". The camera body 102 of which sound pickup property is ranked "weak" less easily picks up the noise from the interchangeable lens 101 in sound pickup than the camera body 102 of which sound pickup property is ranked "strong" does. On the other hand, the camera body 102 of which sound pickup property is ranked "strong" more easily picks up the noise from the interchangeable lens 101 in sound pickup than the camera body 102 of which sound pickup property is ranked "weak" does. The easiness of picking up noise of the camera body 102 of which sound pickup property is ranked "medium" is between the easiness of picking up noise of the camera body 102 of which sound pickup property is ranked "weak" and the easiness of picking up noise of the camera body 102 of which sound pickup property is ranked "strong".

2. Operation of Digital Camera 2-1. Outline of Operation of Digital Camera

The outline of the operation of the digital camera 100 will be described.

When the power switch of the camera body 102 having the interchangeable lens 101 be mounted is turned on, power is supplied from the power supply 154 of the camera body 102 to the respective sections of the digital camera 100 and then various initial settings are performed.

Next, the lens controller 120 requests the sound pickup property information from the camera controller 153. The camera controller 153 transmits the sound pickup property information stored in the flash memory 156 to the lens controller 120. The lens controller 120 decides the maximum value of the driving speed (maximum driving speed) of the zoom lens 112 based on the sound pickup property information and the noise information that is stored in the flash memory 122 of the interchangeable lens 101.

When the zoom ring 115 or the like receives the zooming operation, the lens controller 120 drives the zoom lens 112 at the maximum driving speed.

2-2. Initial Operation

Figure 4:
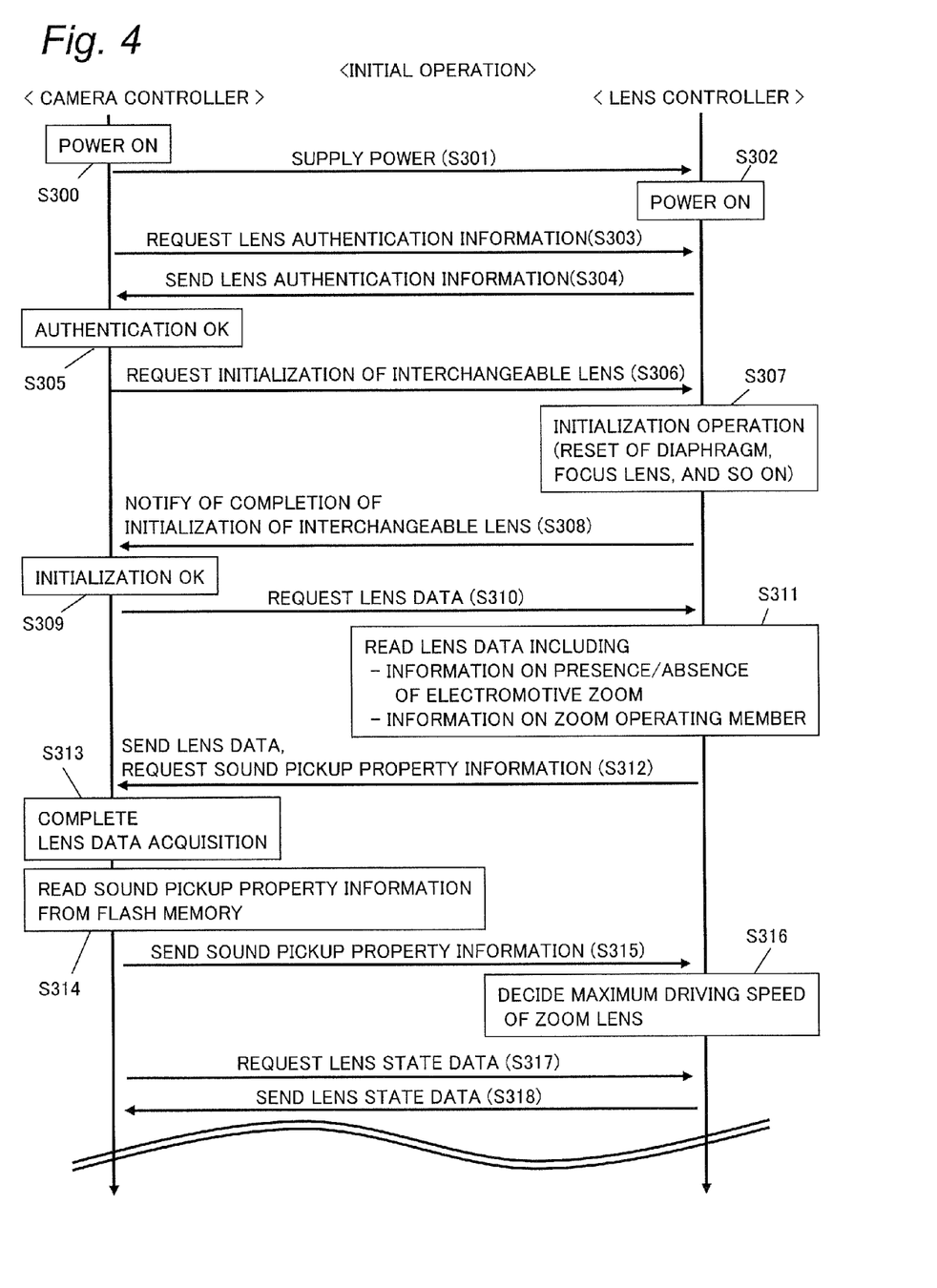
FIG. 4 is a sequence chart for describing an initial operation of the digital camera according to the present embodiment.

The initial operation performed when the power switch of the camera body 102 having the interchangeable lens 101 be mounted is turned on will be described with reference to FIG. 4.

When the power switch of the camera body 102 to which the interchangeable lens 101 is mounted is turned on (S300), the power supply 154 supplies power to the interchangeable lens 101 via the body mount 140 and the lens mount 130 (S301). Accordingly, power is supplied to the respective sections of the interchangeable lens 101 (S302).

Next, the camera controller 153 requests the lens authentication information of the interchangeable lens 101 from the lens controller 120 (S303). Here, "lens authentication information" is information referenced by the camera controller 153 to collect features of the interchangeable lens 101 mounted to the camera body 102. The lens authentication information includes information on the interchangeable lens 101 mounted to the camera body 102 and information indicating whether the interchangeable lens 101 is mounted to the camera body 102 or not. The lens controller 120 responses to the request issued by the camera controller 153 for the lens authentication information by transmitting the lens authentication information to the camera body 102 (S304). With that response, the camera controller 153 completes authentication of the interchangeable lens 112 and understands whether the interchangeable lens 101 is mounted to the camera body 102 or not, or the like (S305).

Next, the camera controller 153 requests the lens controller 120 to perform the initialization operation on the interchangeable lens 101 (S306). When receiving the request for the initialization operation, the lens controller 120 performs the initialization operation including resetting of the focus lens 110, resetting of the zoom lens 112, resetting of the diaphragm 116 and other resetting (S307). Here, the initialization of a lens is driving of the zoom lens 112 to a predetermined position, for example. Then, the lens controller 120 notifies the camera controller 153 that the initialization operation on the interchangeable lens 101 has completed (S308). From that notification, the camera controller 153 understands that the lens has been initialized (S309).

Next, the camera controller 153 requests the lens data which is the data about the interchangeable lens 101 from the lens controller 120 (S310). The lens data is stored in the flash memory 122 of the interchangeable lens 101.

When receiving the request for the lens data from the camera controller 153, the lens controller 120 reads the lens data out from the flash memory 122 (S311). Then, the lens controller 120 transmits the read out lens data to the camera controller 153. At this time, when the lens controller 120 has a function of deciding the maximum driving speed of the zoom lens 112 based on the sound pickup property information, the lens controller 120 requests the sound pickup property information from the camera controller 153 (S312). Here, the lens data includes property values specific to the interchangeable lens 101 such as the name of the lens, the F number, the zoom controllable range, the focus controllable range, information on the operating members. The lens data also includes information indicating the presence/absence of the electromotive zoom function (that is, whether the zoom lens 112 is driven by the zoom lens driver 113 instead of being mechanically driven, based on the user's operation in the interchangeable lens 101). The camera controller 153 understands the presence/absence of the electromotive zoom function of the mounted interchangeable lens 101 and the operating members available to the interchangeable lens 101 by obtaining the information indicating the presence/absence of the electromotive zoom function and the information on the operating members from the lens controller 120.

The interchangeable lens 101 according to the present embodiment includes the zoom ring 115 and the zoom lever 118 as the operating members related to the electromotive zoom function. Therefore, the lens data includes information indicating that the interchangeable lens 101 has two operating members of the zoom ring 115 and the zoom lever 118. When the camera body 102 supports the electromotive zoom function and the operating members (the zoom ring 115 and the zoom lever 118) of the interchangeable lens 101, the camera controller 153 can perform the various controls related to the electromotive zoom on the interchangeable lens 101. When the camera body 102 supports the electromotive zoom, the camera controller 153 can also transmit the sound pickup property information to the interchangeable lens 101. With the above described operation, the camera controller 153 has obtained the lens data of the mounted interchangeable lens 101 (S313).

When receiving the request for transmission of the sound pickup property information in receiving the lens data, the camera controller 153 reads the sound pickup property information out from the flash memory 156 (S314). Then, the camera controller 153 transmits the sound pickup property information to the lens controller 120 (S315).

When receiving the sound pickup property information from the camera controller 153, the lens controller 120 decides the maximum driving speed (the maximum zoom speed) of the zoom lens 112 based on the received sound pickup property information and the noise information stored in the flash memory 122 (S316). Details of a decision method of the maximum driving speed will be described later.

Once the camera body 102 obtains the lens data of the interchangeable lens 101 mounted thereto, the camera body 102 is enabled to pick up an image. When being enabled to pick up an image, the camera controller 153 periodically requests the lens state data indicating a state of the interchangeable lens 101 from the lens controller 120 (S317). The lens state data includes, for example, information on the zoom focal length by the zoom lens 112, position information of the focus lens 110, aperture value information of the diaphragm 116, zoom lever operation information indicating that the zoom lever 118 is operated, and other information. The lens controller 120 responds to the request for the lens state data by transmitting the lens state data to the camera controller 153 (S318).

As described above, the camera body 102 and the interchangeable lens 101 have completed the initial operation by requesting and transmitting the necessary data to each other.

Here, details of a decision method of the maximum driving speed of the zoom lens 112 (S316) will be described. When receiving the sound pickup property information from the camera controller 153, the lens controller 120 refers to the received sound pickup property information, the noise information stored in the flash memory 122 of the interchangeable lens 101, and a table for deciding the maximum driving speed of the zoom lens 112.

For example, when the noise information includes the information shown in FIG. 5A, the noise information 301 indicates that the loudness of the noise produced by the zoom lens 112 driven at the low speed is "small" and the loudness of the noise produced by the zoom lens 112 driven at the high speed is "medium". The noise information 301 is changed according to the type of the interchangeable lens 101.

For example, when the table includes the information shown in FIG. 5B, in the table 302, a circle (symbol) in the field that are specified by the combinations of the sound pickup property of the camera body 102 indicated by the sound pickup property information and the loudness of the noise from the interchangeable lens 101 indicated by the noise information denotes that the driving speed corresponding to the loudness of the noise can be set to drive the zoom lens 112. This is because when the zoom lens 112 is driven at the driving speed corresponding to the loudness of the noise that is marked with circle in the table 302, the probability that the microphone 180 picks up the driving sound of the zoom lens 112 as a noise is low.

Also, in the table 302, a cross (symbol) in the field that are specified by the combinations of the sound pickup property of the camera body 102 indicated by the sound pickup property information and the loudness of the noise from the interchangeable lens 101 indicated by the noise information denotes that the driving speed corresponding to the loudness of the noise cannot be set to drive the zoom lens 112. This is because when the zoom lens 112 is driven at the driving speed corresponding to the loudness of the noise which is marked with cross in the table 302, the probability that the microphone 180 picks up the driving sound of the zoom lens 112 as a noise is high.

The lens controller 120 refers to the table 302 including the above described information to decide the highest driving speed among the driving speeds settable to the zoom lens 112 as the maximum driving speed of the zoom lens 112.

In the table 302, for example, when the sound pickup property of the camera body 102 is "weak", any of "small", "medium", and "big" for the loudness of the noise from the zoom lens 112 is marked with circle. Therefore, the maximum driving speed of the zoom lens 112 is decided to be the high speed in any of the cases where the loudness of the noise from the zoom lens 112 is "small", "medium", and "large" in the low speed driving mode and in the high speed driving mode.

For example, when the loudness of the noise from the zoom lens 112 driven at the low speed is "medium" and the loudness of the noise from the zoom lens 112 driven at the high speed is "large", a circle is marked in the table 302 in either of the cases where the driving speed of the zoom lens 112 is the high speed and the low speed. Therefore, in this example, the maximum driving speed of the zoom lens 112 is decided to be the high speed.

In the table 302, when the sound pickup property of the camera body 102 is "medium", a circle is marked for "small" and "medium" of the loudness of the noise from the zoom lens 112 and a cross is marked for "large" of the loudness of the noise from the zoom lens 112. Therefore, for example, the driving speed of the zoom lens 112 can be set to the high speed, when the sound pickup property of the camera body 102 is "medium" while the loudness of the noise from the zoom lens 112 driven at the high speed is "medium", because probability that the noise is picked up is low. That is, in this example, the maximum driving speed of the zoom lens 112 is decided to be the high speed.

Now, it is assumed that the loudness of the noise from the zoom lens 112 driven at the high speed is "large" and the loudness of the noise from the zoom lens 112 driven at the low speed is "medium". In that case, since the sound pickup property of the camera body 102 is "medium", the probability that the noise from the zoom lens 112 driven at the high speed ("large") is picked up is high. Therefore, the driving speed of the zoom lens 112 cannot be set to the high speed. On the other hand, since the sound pickup property of the camera body 102 is "medium", the probability that the noise from the zoom lens 112 driven at the low speed ("small") is picked up is low. Therefore, the driving speed of the zoom lens 112 can be set to the low speed. Accordingly, in this example, the maximum driving speed of the zoom lens 112 is decided to be the low speed.

In the table 302, when the sound pickup property of the camera body 102 is "strong", a circle is marked for "small" of the loudness of the noise from the zoom lens 112 and a cross is marked for "medium" and "large" of the loudness of the noise from the zoom lens 112. Therefore, when the loudness of the noise from the zoom lens 112 driven at the high speed is "medium" or "large" and the loudness of the noise from the zoom lens 112 driven at the low speed is "small", the driving speed of the zoom lens 112 cannot be set to the high speed but can be set to the low speed. Accordingly, in this example, the maximum driving speed of the zoom lens 112 is decided to be the low speed.

When the loudness of the noise from the zoom lens 112 driven at the high speed is "large" and the loudness of the noise from the zoom lens 112 driven at the low speed is "medium", the driving speed of the zoom lens 112 can be set neither to the high speed nor to the low speed according to the table 302. In this case, the maximum driving speed of the zoom lens 112 is set to the low speed exceptionally. In addition, in this case, the liquid crystal monitor 163 may display information indicating that the noise caused by drive of the zoom lens 112 is possibly to be picked up.

2-3. Zoom Operation

Figure 6:
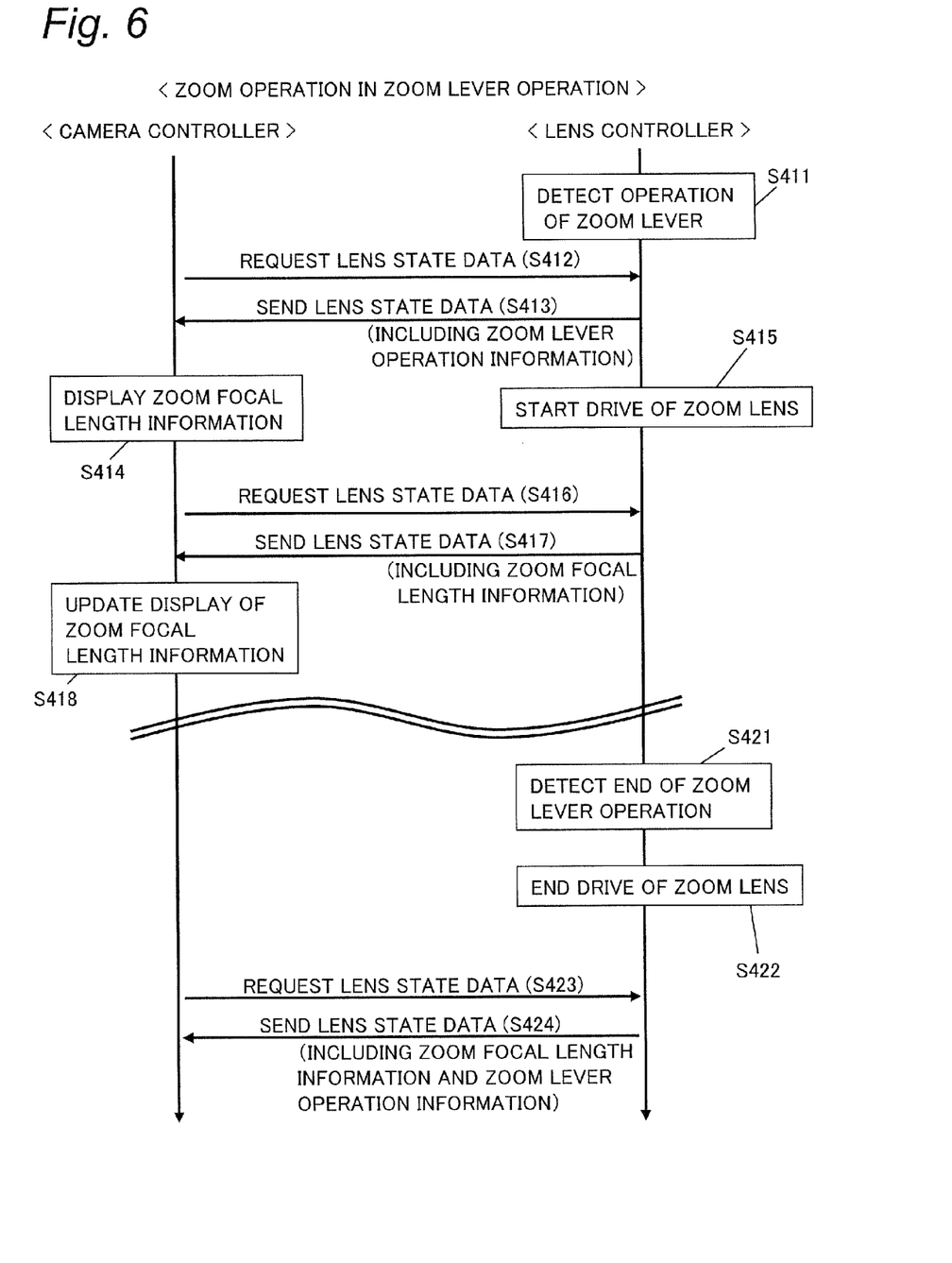
FIG. 6 is a sequence chart for describing a zoom operation of the digital camera according to the present embodiment.

The zoom operation according to the present embodiment will be described with reference to FIG. 6.

When the zoom lever 118 of the interchangeable lens 101 receives user's operation, the lens controller 120 detects the operation performed on the zoom lever 118 (S411). When receiving the request for the lens state data periodically transmitted from the camera controller 153 (S412), the lens controller 120 replies with the lens state data including the zoom lever operation information indicating that the zoom lever 118 is operated (S413).

When understanding that the zoom lever 118 is operated based on the received zoom lever operation information, the camera controller 153 displays the zoom focal length information included in the lens state data on the liquid crystal monitor 163 (S414). The zoom focal length information is displayed to present the focal length decided by the position of the zoom lens 112 to the user. The liquid crystal monitor 163 may display only the position of the zoom lens 112 or the zoom magnification calculated from the focal length, instead of displaying the zoom focal length information.

On the other hand, when the zoom lever 118 is operated, the lens controller 120 starts driving the zoom lens 112 at the maximum driving speed that is decided in the initial operation (S415). The camera controller 153 keeps periodically requesting the lens state data while the zoom lever 118 is receiving the operation (S416). When receiving the request for the lens state data, the lens controller 120 transmits the lens state data to the camera controller 153 (S417). Since the zoom lens 112 has already been driven, the zoom focal length information included in the lens state data to be transmitted to the camera controller 153 is sequentially updated. The camera controller 153 updates the zoom focal length information displayed on the liquid crystal monitor 163 based on the zoom focal length information included in the received lens state data (S418). As such, the camera controller 153 updates the zoom focal length information displayed on the liquid crystal monitor 163 by obtaining the lens state data from the interchangeable lens 101 even while the zoom lens 112 is being driven. Accordingly, the digital camera 100 can present the driving state and/or the focal length of the zoom lens 112 to the user.

When the zoom magnification of the interchangeable lens 101 reaches a desired magnification, the user of the digital camera 100 stops operating the zoom lever 118. At this moment, the lens controller 120 detects that the operation on the zoom lever 118 has finished (S421). When detecting that the operation on the zoom lever 118 has finished, the lens controller 120 sends a halt instruction to the zoom lens driver 113 and finishes driving the zoom lens 112 (S422).

After the end of driving the zoom lens 112, when receiving the request for the lens state data periodically transmitted from the camera controller 153 (S423), the lens controller 120 transmits the lens state data including the zoom focal length information corresponding to the position where the zoom lens 112 finally stops and the zoom lever operation information indicating that the operation on the zoom lever 118 has finished (S424).

In this example, when the zoom lever 118 is operated, the zoom lens 112 is driven at the maximum driving speed. However, the lens controller 120 may decide the driving speed of the zoom lens 112 based on the angle of the inclined zoom lever 118. In this case, the zoom lens 112 is driven at the maximum driving speed when the driving speed based on the angle of the zoom lever 118 is the maximum driving speed or higher. The zoom lens 112 is driven at the driving speed based on the angle of the zoom lever 118 when the driving speed based on the angle of the zoom lever 118 is lower than the maximum driving speed.

When the zoom ring 115 is operated, the lens controller 120 decides the driving speed of the zoom lens 112 based on the rotational displacement and/or the rotational speed of the zoom lens 115. In this case, as in the case where the zoom lever 118 is operated, the zoom lens 112 is driven at the maximum driving speed when the driving speed based on the operation on the zoom ring 115 is the maximum driving speed or higher. The zoom lens 112 is driven at the driving speed based on the operation on the zoom ring 115 when the driving speed based on the operation on the zoom ring 115 is lower than the maximum driving speed.

3. Conclusion of Present Embodiment

As described above, the interchangeable lens 101 of the present embodiment can be mounted to the camera body 102. The interchangeable lens 101 includes the zoom lens 112 that can change a field angle of a subject image; and the lens controller 120 for receiving sound pickup property information from the camera body 102 wherein the sound pickup property information indicates sound pickup property of the camera body 102 and controlling drive of the zoom lens 112. The lens controller 120 decides a driving speed which can be set to the zoom lens 112 based on the sound pickup property information.

The camera body 102 of the present embodiment can be mounted with the interchangeable lens 101. The camera body 102 includes the microphone 180 for picking up ambient sound; the flash memory 156 for storing sound pickup property information as information indicating sound pickup property of the microphone 180; and the camera controller 153 for transmitting the sound pickup property information to the interchangeable lens 101.

According to the interchangeable lens 101 and the camera body 102, the interchangeable lens 101 decides the driving speed which can be set to the zoom lens 112 based on the sound pickup property information transmitted from the camera body 102. This arrangement can reduce the noise that is caused by drive of the zoom lens 112 and picked up by the microphone 180 of the camera body 102 in comparison to the conventional art.

According to the interchangeable lens 101 and the camera body 102, the interchangeable lens 101 decides the maximum value of the driving speed of the zoom lens 112 decided based on the sound pickup property information as the maximum driving speed. Then, the interchangeable lens 101 drives the zoom lens 112 at the maximum driving speed. Accordingly, the interchangeable lens 101 can drive the zoom lens 112 as fast as possible while restraining sound pickup of noise caused by drive of the zoom lens 112 more than the conventional art can.

According to the interchangeable lens 101 and the camera body 102, the interchangeable lens 101 decides the driving speed of the zoom lens 112 based on the operation received by the zoom lever 118 and/or the zoom ring 115. When the decided driving speed is the maximum driving speed or higher, the interchangeable lens 101 drives the zoom lens 112 at the maximum driving speed, and when the decided driving speed is lower than the maximum driving speed, the interchangeable lens 101 drives the zoom lens 112 at the decided driving speed. Accordingly, the interchangeable lens 101 can drive the zoom lens 112 at the driving speed which corresponds as best as possible to the user's zooming operation while restraining sound pickup of noise caused by drive of the zoom lens 112 in comparison to the conventional art.

Since the interchangeable lens 101 and the camera body 102 do not specially need a soundproof configuration for restraining sound pickup of noise, the interchangeable lens 101 and the camera body 102 can hold back increasing of the apparatus size unlike an interchangeable lens and a camera body which specially need a soundproof configuration.

4. Other Embodiments

The idea of the above described embodiment is not limited to the embodiment described above. Various embodiments may also be considered. Other embodiments to which the idea of the above described embodiment can be applied will be described below.

(1) In the above described embodiment, the driving speed of the zoom lens 112 is set to either "high speed" or "low speed". The noise information indicates the loudness of the noise for each of the cases where the driving speed of the zoom lens 112 is set to "high speed" and to "low speed". However, the embodiment may be altered as below. The driving speed of the zoom lens 112 may be set to one of the three or more staged driving speeds instead of the two staged speeds of "high speed" and "low speed". The driving speed of the zoom lens 112 may be set to a single-staged driving speed. However, when the driving speed of the zoom lens 112 is set to any of the three or more staged driving speeds or when the driving speed of the zoom lens 112 is set to a single-staged driving speed, the noise information includes the loudness of the noise of the zoom lens 112 corresponding to the driving speed which can be set to the zoom lens 112. When including the loudness of the noise for a single-staged driving speed, the noise information may include a calculation formula, an algorithm, and/or the like for calculating the loudness of the noise.

(2) In the above described embodiment, basically, the communication between the interchangeable lens 101 and the camera body 102 during the initial operation upon switching on the power supply of the camera body 102 is such that the interchangeable lens 101 responds to a request made by the camera body 102. However, the idea of the above described embodiment is not limited to this communication method. The interchangeable lens 101 may request the sound pickup property information from the camera body 102 and, in response to the request, the camera body 102 may transmit the sound pickup property information to the interchangeable lens 101.

(3) In the above described embodiment, the interchangeable lens 101 includes the zoom lever 118 for the zooming operation. However, the digital camera 100 may be configured as below. The camera body 102 may include an operating member for the zooming operation. That is, the camera side operation unit 170 may include a member for the zooming operation. In this case, the camera body 102 notifies the interchangeable lens 101 of information indicating the zooming operation received by the camera side operation unit 170, and the interchangeable lens 101 drives the zoom lens driver 113 based on the notified information.

(4) In the above described embodiment, the driving speed of the zoom lens 112 is adjusted to reduce the noise caused by drive of the zoom lens 112. However, in order to reduce the noise caused by drive of another member, the driving speed of this member may be adjusted. For example, in order to reduce the noise caused by drive of the focus lens 110 and/or the diaphragm 116, the driving speed of the focus lens 110 and/or the diaphragm 116 may be adjusted.

(5) In the above described embodiment, the table 302 which is referred for deciding the maximum driving speed of the zoom lens 112 is stored in the flash memory 122 of the interchangeable lens 101. However, the table 302 may be stored in a storage means other than the flash memory 122. For example, the flash memory 156 of the camera body 102 may store the table 302. In this case, the lens controller 120 obtains the table 302 from the camera body 102 side via the lens mount 130 and the body mount 140.

(6) In the above described embodiment, the driving speed that can be set to the zoom lens 112 is decided with reference to the table 302. However, the driving speed which can be set may be decided in other ways. For example, the driving speed which can be set may be decided based on the sound pickup property with a predetermined calculation formula or algorithm.

The embodiments have been described above as examples of the art of the present disclosure. For this purpose, the detailed description and the attached drawings have been disclosed. Therefore, some of the elements described in the detailed description and shown in the attached drawings may be unnecessary to solve the problem. Therefore, the unnecessary element should not be instantly recognized as a necessary element merely because being described in the detailed description and shown in the attached drawings.

The above described embodiments exemplify the art of the present disclosure. Therefore, The above described embodiments can be subject to various changes, substitutions, addition, omission and/or the like without departing from the scope of the claims and the their equivalent.

Industrial Applicability

The present disclosure is applicable to an interchangeable lens, an image pickup apparatus and the like such as a lens interchangeable-type digital camera and an lens interchangeable-type camera cellular phone.

What is claimed is:

1. An interchangeable lens mountable to a camera body, comprising:
   a zoom lens operable to change a field angle of a subject image;
   a receiving unit operable to receive sound pickup property information from the camera body, the sound pickup property information is a specific property of the camera body that indicates degree of ability to pick up, by a sound pickup unit provided in the camera body, noise to be produced by the interchangeable lens, the sound pickup unit being operable to pick up ambient sound; and
   a lens controller operable to control drive of the zoom lens, wherein
   the lens controller decides an available driving speed based on the sound pickup property information, the available driving speed being a driving speed settable to the zoom lens, and the sound pickup information is a property used for deciding the available driving speed of the lens.

2. The interchangeable lens according to claim 1, further comprising a storage unit operable to store noise information, the noise information associating a driving speed of the zoom lens with loudness of noise produced when the zoom lens is driven at the driving speed, wherein
the lens controller decides the available driving speed based on the sound pickup property information and the noise information stored in the storage unit.

3. The interchangeable lens according to claim 1, wherein the interchangeable lens and/or the camera body further comprises an operation unit operable to receive an operation to the zoom lens,
the lens controller decides a maximum value of the available driving speed as a maximum driving speed, and
the lens controller sets the driving speed of the zoom lens to the decided maximum driving speed when the operation unit receives the operation.

4. The interchangeable lens according to claim 1, wherein the interchangeable lens and/or the camera body further comprises an operation unit operable to receive an operation to the zoom lens,
the lens controller decides a maximum value of the available driving speed as a maximum driving speed,
the lens controller decides a target driving speed which is a driving speed of the zoom lens based on the operation received by the operation unit, and
the lens controller
sets the driving speed of the zoom lens to the maximum driving speed when the target driving speed is the maximum driving speed or higher, and
sets the driving speed of the zoom lens to the target driving speed when the target driving speed is lower than the maximum driving speed.

5. The interchangeable lens according to claim 1, wherein the sound pickup property information indicates either one of a shape of the camera body, a position of a sound pickup unit in the camera body operable to pick up ambient sound, and/or a distance between the interchangeable lens mounted to the camera body and the sound pickup unit in the camera body.

6. A camera body to which an interchangeable lens is mountable, comprising:
a sound pickup unit operable to pick up ambient sound;
a storage unit operable to store sound pickup property information which a specific property of the sound pickup unit that indicates degree of ability to pick up, the sound pick up unit provided in the camera body, noise to be produced by the interchangeable lens, the sound pickup property information being a property used for deciding an available driving speed of a zoom lens in the interchangeable lens; and
a sending unit operable to send the sound pickup property information to the interchangeable lens.

7. The camera body according to claim 6, wherein the sound pickup property information indicates degree of ability to pick up the noise produced by the interchangeable lens by the camera body.

8. The camera body according to claim 6, wherein the sound pickup property information indicates either one of a shape of the camera body, a position of the sound pick up unit in the camera body, and/or distance between the interchangeable lens mounted to the camera body and the sound pickup unit in the camera body.

9. A camera system comprising a camera body and an interchangeable lens mountable to the camera body, wherein
the camera body comprises:
a sound pickup unit operable to pick up ambient sound;
a storage unit operable to store sound pickup property information which is a specific property of th sound pickup unit that indicates degree of ability to pick up, the sound pickup unit provided in the camera body, noise to be produced by the interchangeable lens; and
a sending unit operable to send the sound pickup property information to the interchangeable lens, and
the interchangeable lens comprises:
a zoom lens operable to change a field angle of a subject image;
a receiving unit operable to receive the sound pickup property information from the camera body, and
a lens controller operable to control drive of the zoom lens, wherein
the lens controller decides an available driving speed based on the sound pickup property information, the available driving speed being a driving speed settable to the zoom lens, and the sound pickup property information is a property used for deciding the available driving speed of zoom lens.

10. The camera system according to claim 9, wherein the interchangeable lens further comprises:
a lens storage unit operable to store noise information, the noise information associating a driving speed of the zoom lens with loudness of noise produced when the zoom lens is driven at the driving speed, and
the lens controller decides the available driving speed based on the sound pickup property information and the noise information stored in the lens storage unit.

11. The camera system according to claim 9, wherein the sound pickup property information indicates degree of ability to pick up the noise produced by the zoom lens by the camera body.

12. The camera system according to claim 9, wherein the interchangeable lens and/or the camera body further comprises an operation unit operable to receive an operation to the zoom lens,
the lens controller decides a maximum value of the available driving speed as a maximum driving speed, and
the lens controller sets the driving speed of the zoom lens to the decided maximum driving speed when the operation unit receives the operation.

13. The camera system according to claim 9, wherein the interchangeable lens and/or the camera body further comprises an operation unit operable to receive an operation to the zoom lens,
the lens controller decides a maximum value of the available driving speed as a maximum driving speed,
the lens controller decides a target driving speed which is a driving speed of the zoom lens based on the operation received by the operation unit, and
the lens controller
sets the driving speed of the zoom lens to the maximum driving speed when the target driving speed is the maximum driving speed or higher, and
sets the driving speed of the zoom lens to the target driving speed when the target driving speed is lower than the maximum driving speed.

14. The camera system according to claim 9, wherein the sound pickup property information indicates either one of a shape of the camera body, a position of the sound pick up unit in the camera body, and/or a distance between interchangeable lens mounted to the camera body and the sound pickup unit in the camera body.

* * * * *